(12) United States Patent
Rinderlin et al.

(10) Patent No.: US 7,828,374 B2
(45) Date of Patent: Nov. 9, 2010

(54) STRUCTURE OF THE FRONT PART OF A MOTOR VEHICLE

(75) Inventors: Jürgen Rinderlin, Vörstetten (DE); Michael Breisacher, Rochester Hills, MI (US)

(73) Assignee: Peguform GmbH, Bötzingen (DE)

( * ) Notice: Subject to any disclaimer, the term of this patent is extended or adjusted under 35 U.S.C. 154(b) by 186 days.

(21) Appl. No.: 11/994,904

(22) PCT Filed: Jul. 6, 2006

(86) PCT No.: PCT/EP2006/006611
§ 371 (c)(1),
(2), (4) Date: Jul. 14, 2008

(87) PCT Pub. No.: WO2007/003440
PCT Pub. Date: Jan. 11, 2007

(65) Prior Publication Data
US 2009/0174199 A1    Jul. 9, 2009

(30) Foreign Application Priority Data
Jul. 6, 2005    (DE) ....................... 10 2005 031 843

(51) Int. Cl.
*B60N 99/00*    (2006.01)

(52) U.S. Cl. ..................................................... 296/198

(58) Field of Classification Search .................. 296/29, 296/198
See application file for complete search history.

(56) References Cited

U.S. PATENT DOCUMENTS

| 2002/0060474 A1* | 5/2002 | Chung ........................ 296/189 |
| 2002/0063443 A1 | 5/2002 | Lee |

FOREIGN PATENT DOCUMENTS

| DE | 69709609 T2 | 8/2002 |
| DE | 10244455 A1 | 5/2004 |
| DE | 10309636 A1 | 9/2004 |
| DE | 10311221 A1 | 9/2004 |
| DE | 10317178 B3 | 10/2004 |
| EP | 1449749 A1 | 2/2002 |
| EP | 1398249 A | 3/2004 |
| EP | 1457394 A9 | 9/2004 |
| EP | 1574423 A | 9/2005 |
| FR | 2855809 A | 12/2004 |
| GB | 2362615 | 11/2001 |

* cited by examiner

*Primary Examiner*—Lori L Lyjak
(74) *Attorney, Agent, or Firm*—Ursula B. Day; Henry M. Feiereisen

(57) ABSTRACT

The front end structure of a motor vehicle includes a fender support and a fender for attachment to the fender support and an absorber, which is mounted between the fender support and the fender, and wherein the absorber is constructed as a profiled deformation element to which a number of add-on pieces can also be attached.

12 Claims, 5 Drawing Sheets

STRUCTURE OF THE FRONT PART OF A MOTOR VEHICLE

BACKGROUND OF THE INVENTION

The present invention relates to a front end structure of a motor vehicle with a fender support and a fender for attachment to the fender support.

Such vehicle front end structures are provided with a fender support which is attached to the A-column of a motor vehicle and which serves as the support for the fender.

Increased expectations to improve the front end structure of a vehicle are, among others, directed to a demand for better traffic safety especially as it relates to the protection of pedestrians. Therefore, the front end structure of a motor vehicle has to be designed such that an optimal energy absorption, in case of a collision, is realized. Since the general trend in the automobile industry has been to make vehicle assembly more and more compact, it has become problematic to retain a sufficient amount of space required to realize efficient energy absorption.

Current developments on pedestrian protection focus on the requirements of the so-called "lower leg" requirements which relate in particular to the deformation properties in the front end area of the vehicle. Particular measures to improve protection especially of the hip and head area of a pedestrian are still in the pre-development phase. An especially difficult problem remains solving the problem of protecting the heads of pedestrians when considering the height differences in adults and children, since a solution to that problem has to include protecting a child's head in the same manner as that of an adult.

Therefore, in order to realize an effective head protection for pedestrians, a large area in the motor vehicle has to be considered for that purpose which extends especially across the entire width of the vehicle hood area including the adjacent partial areas of the fenders. Especially, the area of transition from the vehicle hood to the fender or mud guard and the fender support underneath are considered a so-called "hardpoint" and deemed particularly problematic due to a certain stiffening effect the fender imparts, as well as the spatial conditions in that area and the tight space between the fender on the one hand, and the vehicle hood and the rigid fender support on the other.

The present invention is thus based on the problem of providing an improved vehicle front end structure of the afore-discussed type in which the front end area of the vehicle can be designed in a non-rigid manner such that in case of a collision with a pedestrian, the severity of a head injury is reduced, and to thus also securely fulfill the requirements relating to legal crash regulations.

This problem is solved by providing a vehicle front end structure assembly which is designed in accordance with the features of claim 1.

Advantageous embodiments of the invention are defined through the features of the dependent claims.

SUMMARY OF THE INVENTION

The invention is based on the idea of disposing an absorber between the fender support and the fender. In order to provide the necessary space for the absorber, the fender support is shifted somewhat downwards as compared to a vehicle without the absorber. The additional space, in the direction of the Z-axis (relative to the vehicle co-ordinates), gained thereby, permits the placement of the absorber element. The design of the absorber is such that in case of a collision with a pedestrian, the absorber, in the extreme case, is being completely compressed, thus reducing the strain on the pedestrian, whereby a deformation in the Z-direction is realized by the absorber.

The deformation movement is predetermined in a generally known manner in dependence on the geometry of the absorber in combination with the selected starting material and the connection or support between fender and fender support.

In the case of a collision involving a pedestrian, effective energy absorption will thus be realized in that the vehicle hood is supported by the absorber via the fender, which due to the force generated by the crash gets deformed until the absorber rests flat on the fender support.

An ideally uniform force distribution is realized when the absorber extends essentially along the entire interconnected length of the fender support.

The absorber can be configured as a separate assembly part which gets attached to the fender support; or as an alternative, the absorber can be designed as a component part of the fender.

Preferably, the absorber is configured as a deformation profile. Depending on the requirements, the absorber can be of various designs such as for example a longitudinally extending rib, from which supporting webs extend downwardly and in a V-shaped arrangement. Profiled type T-or double T supports are also possible and permit a relatively long deformation path which is especially advantageous as protection against impact.

Due to the corresponding spatially lowered fender support, additional space becomes available into which further integration of functional structures or add-on components for this area can be realized.

Especially preferred is to dispose add-on components directly at the absorber.

Typical examples of such components, to name a few are: water reservoirs, clamps, electrical cables, electrical and electronic components, Bowden cables, bonnet of hood hinges, profiled joints, hood buffers or head lights.

Depending on the particular embodiment, the absorber may include attachment elements to which add-on components can be attached in a simple manner.

According to a further variant, the absorber includes mounting supports for accommodating add-on components. Such mounting supports can also serve, for example, as receptacles for head lights. It is thus possible to construct the absorber as a module carrier, which can take up a number of add-on components; for example head lights, SRA, PDC, bumpers, radiator grills and also the fender itself.

The mounting support, for example, may be configured as a lateral mounting support, which thus serves as seat for the head lights and assembly can further extend into the area of the vehicle center, for attachment of the radiator grill or the bumper.

With the embodiment as a mounting support or module carrying support, an especially advantageous and cost-efficient pre-fabrication is realized, for a considerable reduction of the total assembly costs. In addition, add-on components can thus be accommodated in a space-economic manner, where otherwise they would have to be mounted in prime space in the front end vehicle area.

Cost advantages are also realized in that the absorber and the mounting and module support can be constructed as a one-piece component for example molding the mounting support at the absorber.

The invention will be more readily explained by the following Figures in which the embodiments are schematically represented as examples.

BRIEF DESCRIPTION OF THE DRAWING

It is shown in.

DETAILED DESCRIPTION OF PREFERRED EMBODIMENTS

Figure 1:
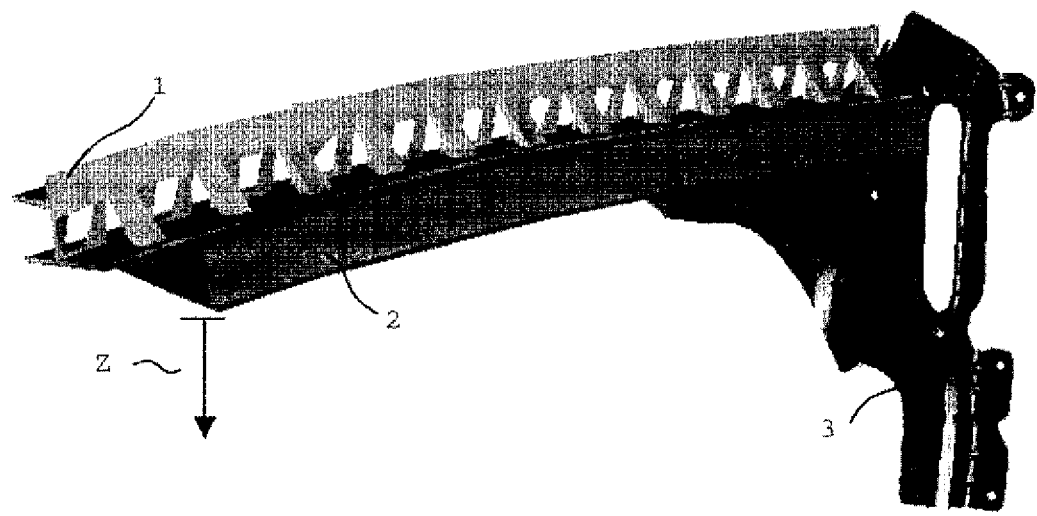
FIG. 1 fender support with absorber.

FIG. 1 shows an absorber 1, which is placed on a fender support 2. The fender support 2 is attached in a known manner to an A- column of a motor vehicle which is not shown here in detail.

The absorber A extends along the entire length of the fender support 2.

From the illustration according to FIG. 1, it is shown that the fender support 2 is displaced downwardly in the direction of an axis Z, as compared to a comparison vehicle, in order to gain space for the absorber. This space is utilized foremost to provide deformation space for the absorber 1 which is placed on the fender support 2. The fender support 2 can be dimensioned somewhat less large relative to the comparison vehicle. It can, for example have a reduced cross section, since a portion of the load is taken up by the absorber 1.

Figure 2:
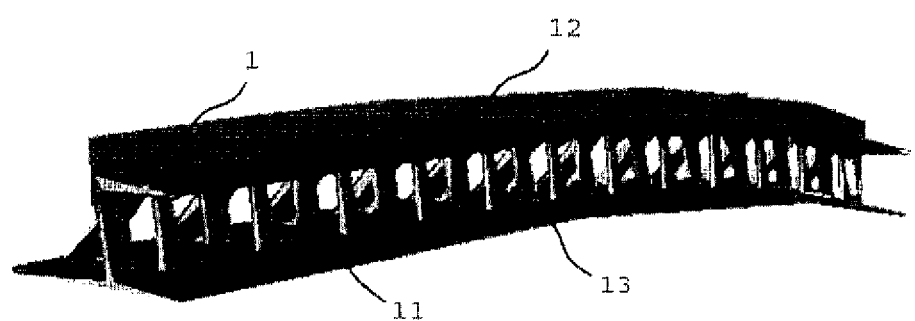
FIG. 2 absorber as a separate component.

In FIG. 2, the absorber 1 is again shown as a separate component illustrating the general assembly as a deformation element. As compared to the representation according to FIG. 1, a perspective view of the opposite side was chosen, that is, the side from the engine space.

The absorber 1 is constructed as a T- or double T-shaped profile support which includes a multitude of support webs 11 that extend in roughly V-shape manner laterally to both sides into a longitudinally extending rib 12, and are supported by a bearing area 13. Design and materials are selected in order to realize a desired deformation pattern. In case a collision occurs, the support webs 11 are being deformed to an extent so that the absorber 1 bears flat upon the fender support 2.

Figure 3:
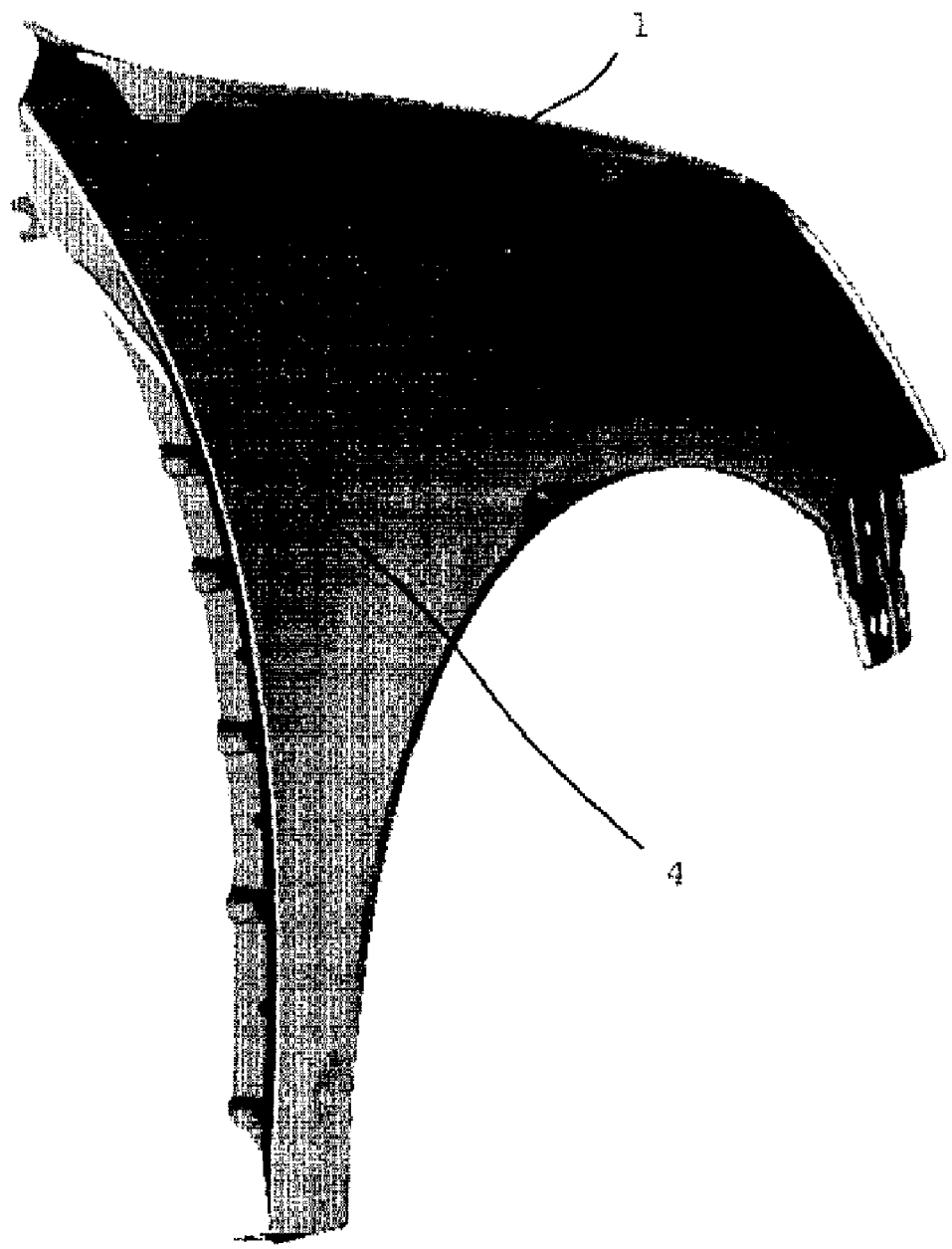
FIG. 3 fender with an integrated absorber.

FIG. 3 shows a fender 3, where the absorber 1 is an integrated component of a fender. In that case the fender 4 together with absorber 1 will come to be placed onto the fender support which is not shown here.

Figure 4:
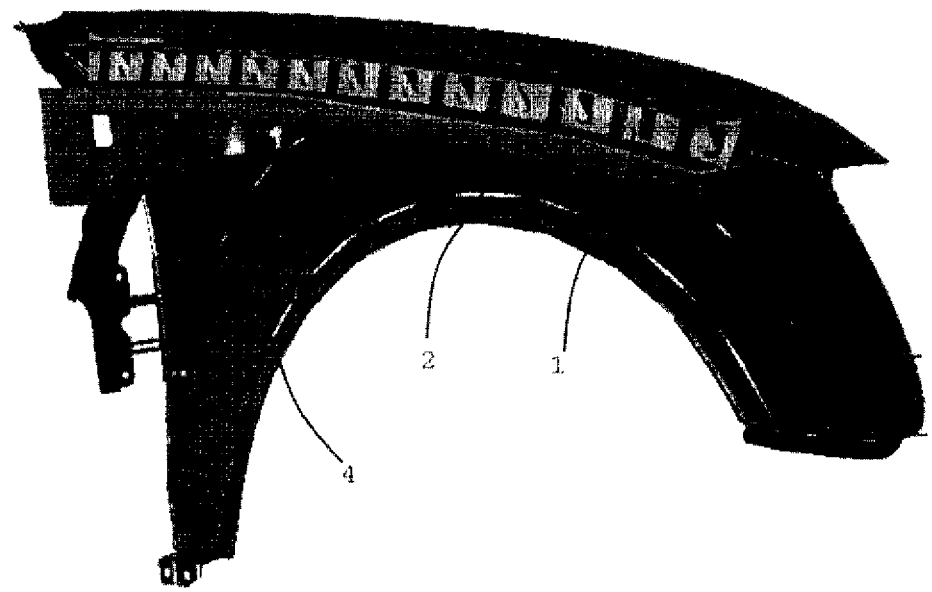
FIG. 4 fender with integrated absorber according to FIG. 3, where the view is from the engine space.

The corresponding assembly stage is shown in FIG. 4. This view which is from the point of the engine space, it is seen that the absorber 1 extends longitudinally entirely between the fender 4 and the fender support 2.

Figure 5:
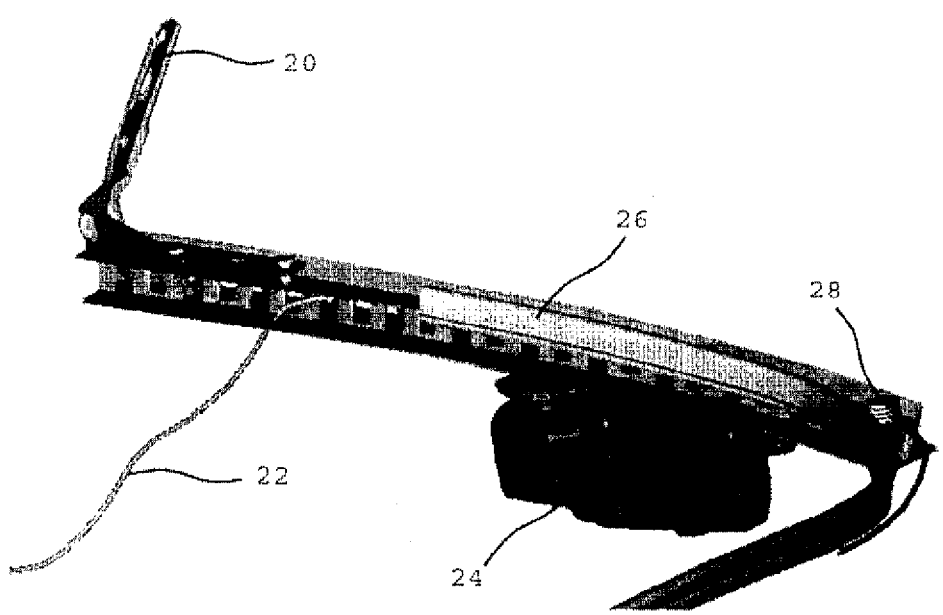
FIG. 5 absorber, at expansion level as a module support.

FIG. 5 shows the absorber 1, which is provided with various add-on components. Seen are a hood hinge 20, a Bowden cable 22, a water reservoir 24, a profiled joint 26, as well as a hood buffer 28. In this way, the absorber has the expanded function as a module carrier unit. The add-on components can also be retro-fitted; and it is also possible that they are mounted at the absorber 1 in a pre-assembly stage and then be mounted together with these at the fender support 2.

Figure 6:
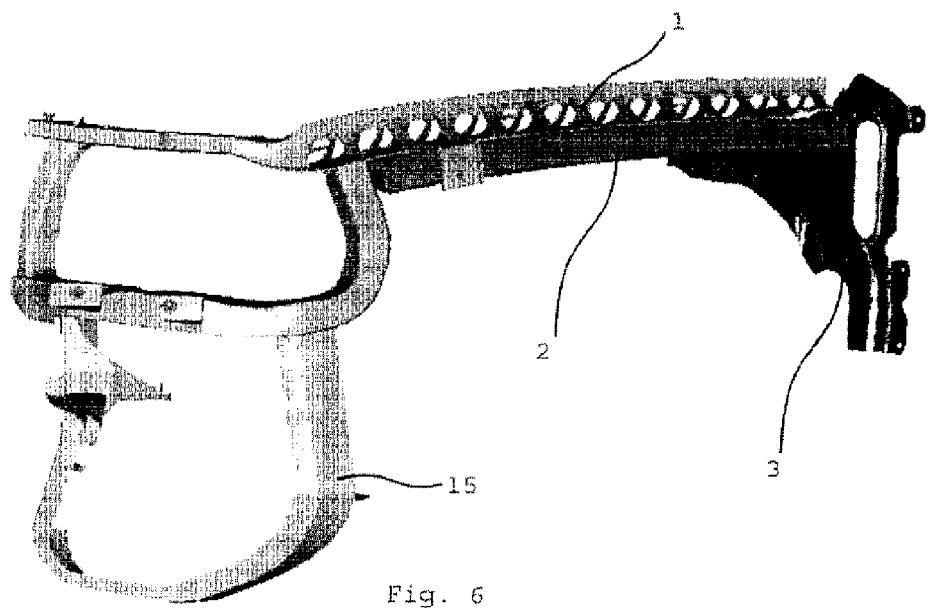
FIG. 6 absorber, at expansion level with lateral mounting support for mounting module.

FIG. 6 shows an extension of the absorber 1 by a lateral mounting support 15, which can also fulfill the below-discussed additional functions in more detail. Furthermore, with this configuration, frontal and lateral absorption of energy is realized.

Figure 7:
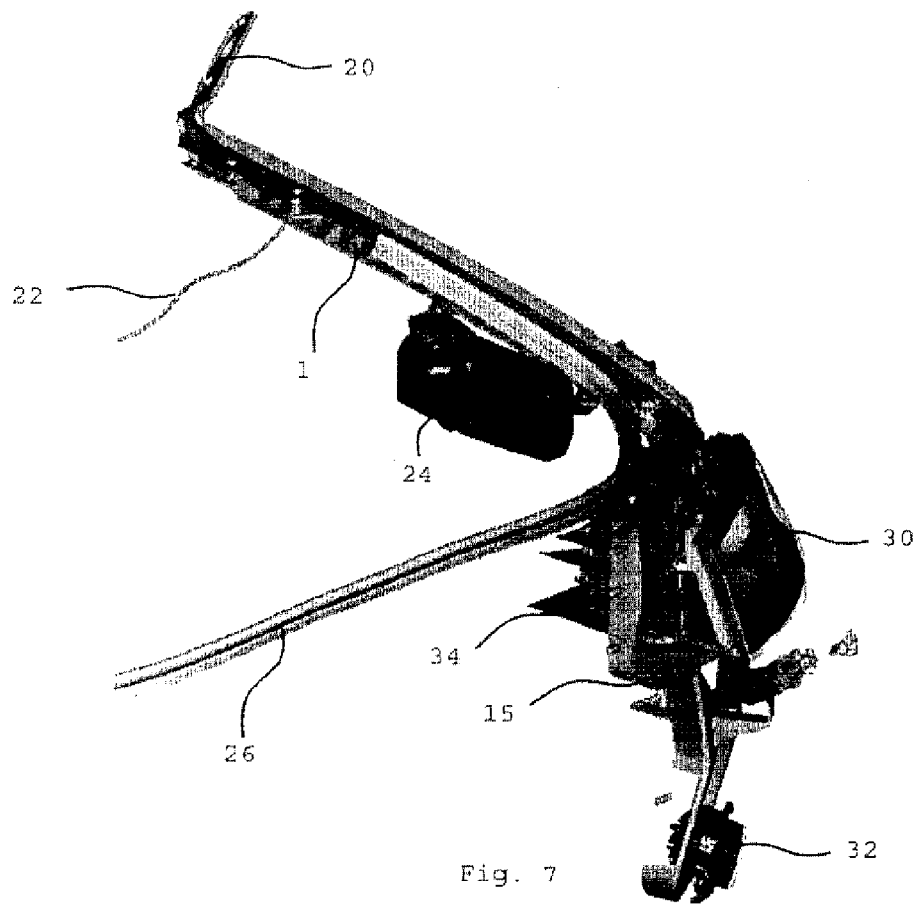
FIG. 7 absorber, at expansion level according to FIG. 6 with add-on components and integration of further functional elements.
Figure 8:
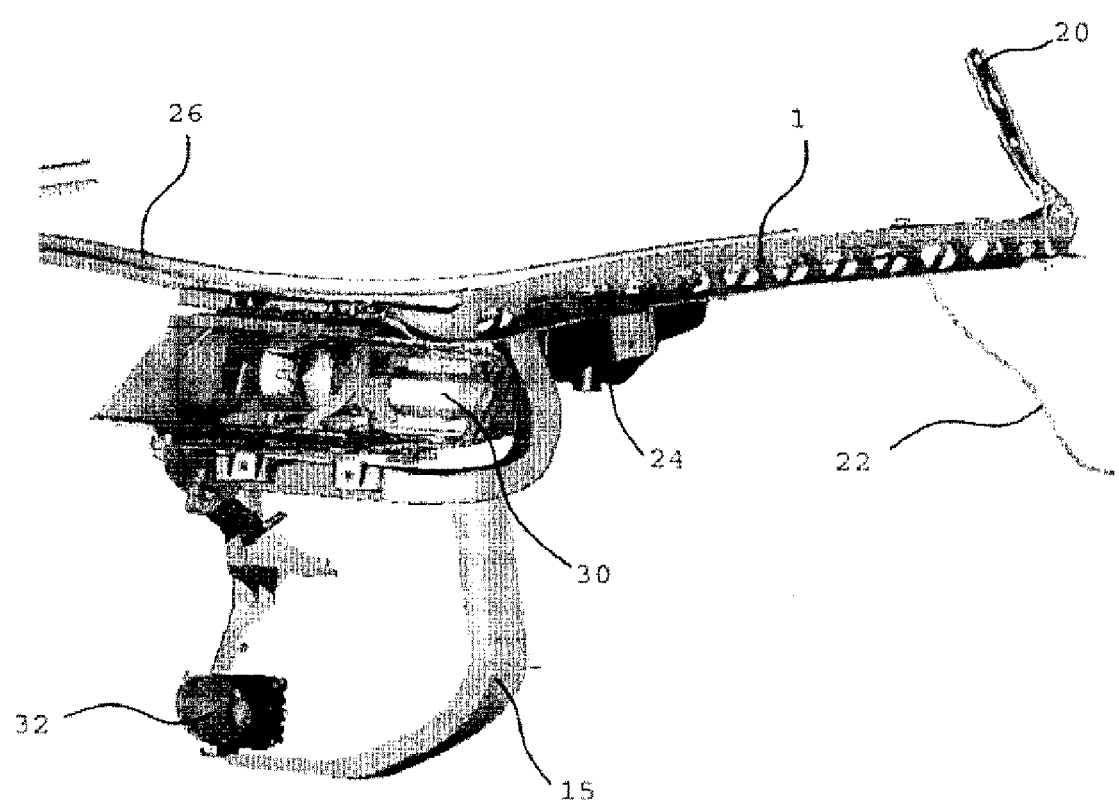
FIG. 8 absorber according to FIG. 7 showing another perspective view.

The assembly of the lateral mounting support 15 with add-on components is seen from FIG. 7 and FIG. 8 which show the absorber 1 with a lateral module support 15 in two different perspectives. In addition to the add-on components of FIG. 5, namely the hood hinge 20, the Bowden cable 22, the water reservoir 24 and the joint profile 26, there are also shown a main headlight 30, a fog head light 32 as well as attachment elements 34, which are utilized for example for attachment of a radiator grill (not shown here) or similar.

The foregoing shows that the absorber 1 in addition to its main function serving as a deformation element, also serves as an improved protection for pedestrians by its additional functions, so that a module support for add-on can be realized.

What is claimed is:

1. A vehicle front end structure for a motor vehicle comprising: a fender support, a fender for attachment to the fender support, and an absorber, wherein said absorber is disposed between the fender support and the fender, wherein the absorber extends essentially along an entire length of the fender support.

2. The vehicle front end structure according to claim 1, wherein the absorber is constructed as a separate component, which is attached to the fender support.

3. The vehicle front end structure according to claim 1, wherein the absorber is a component of the fender.

4. The vehicle front end structure according to claim 1, wherein the absorber is embodied as deformation profile with defined deformation properties.

5. The vehicle front end structure according to claim 1, further comprising one or more add-on components for attachment to the absorber selected from the group consisting of clamps, electrical cables, electric components, electronic components, Bowden cables, hood hinges, water reservoirs, joint profiles, hood buffers and headlights.

6. The vehicle front end structure according to claim 5, wherein the absorber includes attachment elements for holding the add-on components.

7. The vehicle front end structure according to claim 5, wherein the absorber includes one or more mounting supports for receiving add-on components.

8. Vehicle front end structure according to claim 7, wherein the one mounting support is formed as part of the absorber.

9. The vehicle front end structure according to claim 8, wherein the mounting support is constructed as a lateral mounting support.

10. The vehicle front end structure according to claim 9, wherein the lateral mounting support extends to a center axis of the vehicle.

11. A method for constructing a front end structure of a motor vehicle comprising: disposing an absorber between a fender and a fender bank of the motor vehicle.

12. The method of claim 11, wherein the absorber is fixedly attached to the fender bank.

* * * * *